(No Model.)
D. M. JONES.
VETERINARY OBSTETRICAL FORCEPS.
No. 497,720.                     Patented May 16, 1893.
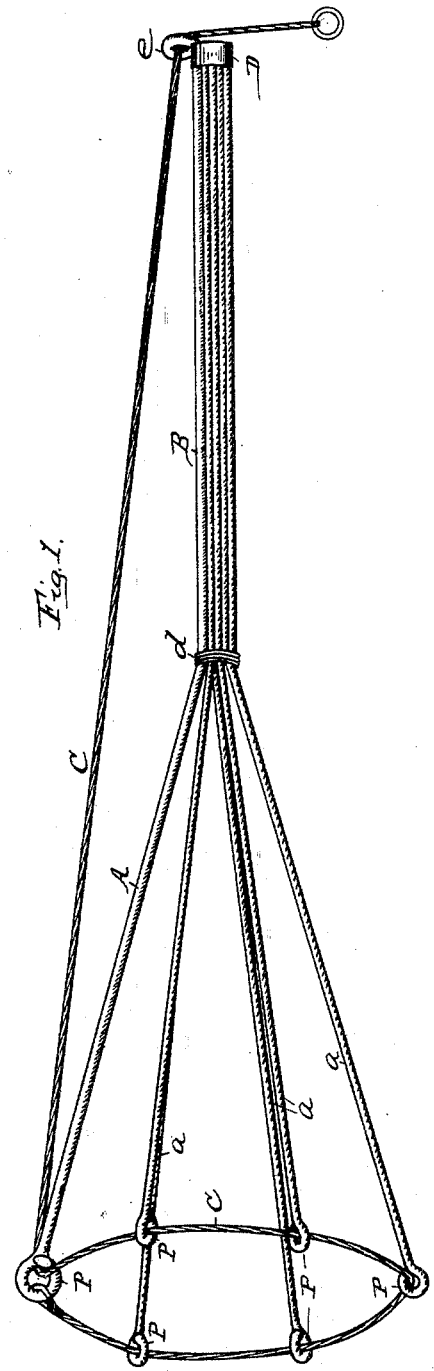
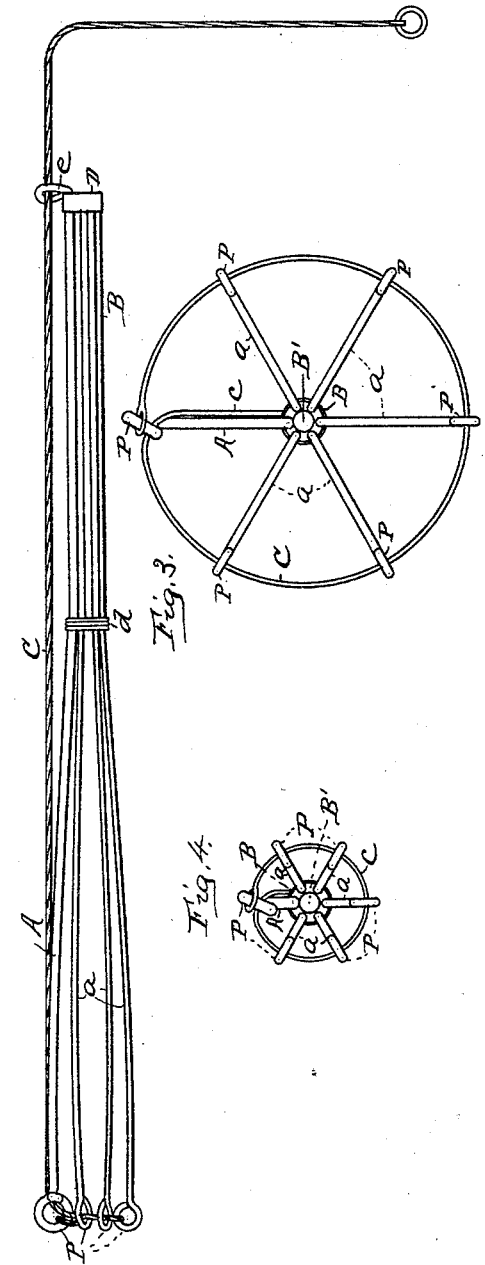
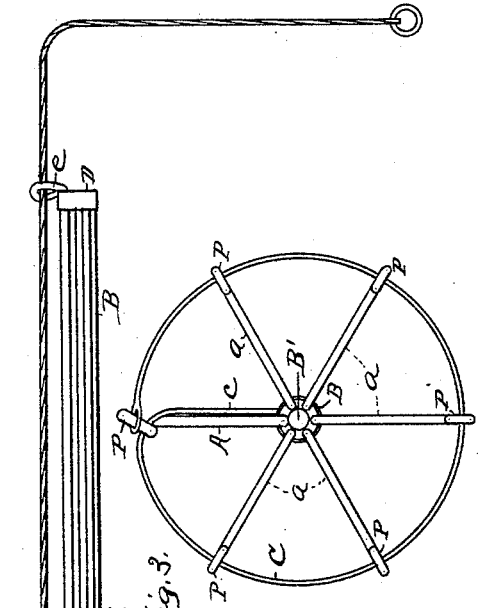
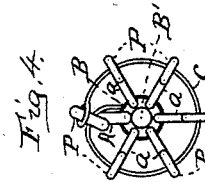
Witnesses
N. B. Hagin.
N. C. Hutchins
Inventor.
Daniel M. Jones
By Wm. J. Hutchins Atty

UNITED STATES PATENT OFFICE.

DANIEL M. JONES, OF WICHITA, KANSAS.

VETERINARY OBSTETRICAL FORCEPS.

SPECIFICATION forming part of Letters Patent No. 497,720, dated May 16, 1893.

Application filed June 6, 1892. Serial No. 435,706. (No model.)

*To all whom it may concern:*

Be it known that I, DANIEL M. JONES, a citizen of the United States of America, residing at Wichita, in the county of Sedgwick and State of Kansas, have invented certain new and useful Improvements in Obstetrical Forceps, of which the following is a specification, reference being had therein to the accompanying drawings and the letters of reference thereon, forming a part of this specification, in which—

Figure 1 is a perspective view of the forceps, showing the arms thereof expanded; Fig. 2, a side view of the same, showing the said arms contracted; Fig. 3, an end view of the forceps, showing the arms thereof expanded, and Fig. 4, a similar view, showing the said arms contracted.

This invention relates to certain improvements in obstetrical forceps, adapted, especially, for use with animals, and consists in the arrangement of a plurality of concentrically arranged yielding and diverging arms, respectively terminating with an eye; a handle connecting with the arms; and a cord arranged passing through the arm eyes and extending in the direction of the handle, which is adapted, when pulled, to contract, or draw together the terminals of the arms, which improvements are fully set forth and explained in the following specification and pointed out in the claims.

Referring to the drawings, $a$ represents a plurality of yielding diverging arms, and A a like arm, but of larger and therefore stronger material, and hence having greater tension than the fellow arms. Said arms are preferably made of wire, and are brought together, concentrically, at a given point where they are bound together or otherwise properly secured, as shown at $d$, and from said point they extend in such compact concentric order a sufficient distance to form the handle B, and terminate with a binder or other suitable means of securing them together, as shown at D; one of said wires, however, at said handle terminal is longer than the fellow wires, and is bent to form the side extending eye $e$. As a means of somewhat increasing the diameter of the handle B I have centrally arranged therein a core of wire or other suitable material as shown at B' in Figs. 3 and 4. Each of the said diverging arms terminates with an eye P, as shown, and $c$ represents a cord arranged passing about through said eyes, and is secured at one end to the eye of the master arm A, while its opposite end is passed through said eye and extends in the direction of the handle B and is passed through the eye $e$ and terminates with an attached ring, or other enlargement to prevent its return through said eye $e$.

In use the handle B is grasped in one hand; the cord is then pulled by the other hand, which action reduces the quantity of cord which passes about through the eyes of the forceps arms, and therefore contracts, or draws together, said arm terminals, from a position shown in Figs. 1 and 3, to a position shown in Figs. 2 and 4, when the forceps is ready to be inserted, and is, in such position of arms, inserted, a distance, until the object to be extracted is reached, when the cord is released, which permits the tension of the arms to act and thereby permit the arms to expand, when further insertion is made, which will cause the said arms, and cord held by the arms, to overreach the said object, when the cord is again pulled, which will contract the arm terminals and cord therein about the object, when by firmly holding the cord drawn, and removing the forceps the object may be extracted therewith.

The purpose of making the master arm A of greater tension than the fellow arms is, to provide in said master arm a tension sufficient to counter-balance the tension of the combined fellow arms, which becomes necessary for the reason that, by securing the cord end to the eye of the master arm, and also in passing the cord through and from said eye, the said arm receives the major strain, and becomes a point of strain from which the other fellow arms are drawn and hence must withstand the combined strain of the fellow arms $a$.

Having thus described my invention, what I claim as new and useful, and desire to secure by Letters Patent, is as follows:

1. The herein described obstetrical forceps, consisting of the handle portion; the concentrically arranged and diverging yielding arms extending from said handle, and terminating in eyes; and the cord passing through said eyes, having one end secured to one of said eyes and its opposite end extended in the direction of the handle, substantially as and for the purpose set forth.

2. The obstetrical forceps described comprising the handle portion provided at one end with a side extending eye, and at its opposite end with concentrically arranged diverging and yielding arms, which terminate in eyes; and the cord arranged at one end portion passing through said arm eyes, and through the eye of the handle at its opposite end portion, substantially as and for the purpose set forth.

DANIEL M. JONES.

Witnesses:
WM. J. HUTCHINS,
N. B. HAGIN.